United States Patent
Fujitani et al.

[11] Patent Number: 5,071,221
[45] Date of Patent: Dec. 10, 1991

[54] WATER PENETRATION PREVENTIVE CABLE

[75] Inventors: Noriaki Fujitani; Kiichi Itoh; Kohji Kato, all of Yokkaichi, Japan

[73] Assignee: Mitsubishi Petrochemical Company Limited, Tokyo, Japan

[21] Appl. No.: 388,941

[22] Filed: Aug. 3, 1989

[30] Foreign Application Priority Data

| Aug. 5, 1988 [JP] | Japan | 63-195343 |
| Sep. 5, 1988 [JP] | Japan | 63-221954 |
| Sep. 5, 1988 [JP] | Japan | 63-221955 |
| Sep. 5, 1988 [JP] | Japan | 63-221956 |
| Sep. 5, 1988 [JP] | Japan | 63-221957 |

[51] Int. Cl.$^5$ .............................................. G02B 6/44
[52] U.S. Cl. ...................................... 385/100; 385/114
[58] Field of Search .................................... 350/96.23

[56] References Cited

U.S. PATENT DOCUMENTS

| 4,703,997 | 11/1987 | Ijiri et al. | 350/96.23 |
| 4,711,523 | 12/1987 | Iri et al. | 350/96.23 |
| 4,743,085 | 5/1988 | Jenkins et al. | 350/96.23 |
| 4,752,113 | 6/1988 | Saito et al. | 350/96.23 |
| 4,767,184 | 8/1988 | Ogasawara et al. | 350/96.23 |
| 4,768,856 | 9/1988 | Hofmann et al. | 350/96.23 |

*Primary Examiner*—William L. Sikes
*Assistant Examiner*—Robert E. Wise
*Attorney, Agent, or Firm*—Wegner, Cantor, Mueller & Player

[57] ABSTRACT

A water penetration preventive cable comprising an assembly of linear elements comprising a core wire in various forms and an optional linear tensile strength element, the assembly being covered with a sheath, characterized in that the linear elements and/or the sheath are wound with a water absorptive tape, and/or in that the gap between the linear elements and/or between the linear element and the sheath is filled with a linear water absorptive linear elements, wherein the water absorptive tape and water absorptive linear elements are made of a water absorptive polymer supported on a tape-like or linear support.

9 Claims, 5 Drawing Sheets

WATER PENETRATION PREVENTIVE CABLE

BACKGROUND OF THE INVENTION

1. Field of the Invention

This invention relates to improvements in a cable having an optical fiber core wire or thread or a conductor core wire. More particularly, the invention relates to a water penetration preventive cable such that so-called "running of water" is prevented, namely water which has come into the cable upon damages of the water covering is prevented from running longitudinally of the cable and particularly to the improvements in the cable.

A cable having optical fiber core wires or a cable having conductor core wires is known, and the former is particularly noted for expected future prosperity upon development of an optical communication technique.

Such cables have various structures in view of the type of the assembly of core wires or threads, such as layer-strand type, ribbon type, slot ribbon type, slot type or loose pipe type. They generally have a sheath or covering to protect the core wires therein against an external atmosphere. However, the damage of the sheath due to an ageing deterioration or a damage accident is unavoidable. One of the defects when the sheath is damaged is adverse influence to the core wire due to the penetration of the water. If water once penetrates in the cable, it runs longitudinally of the cable to increase the damage, which is inherent in the structure of the cable.

2. Related Art

Such damage due to the penetration of water in the cable is already recognized, and several prior inventions of so-called "water penetration preventive cable" have been heretofore proposed. They are all devised to fill up a gap or a vacant space in the cable which will make a passage of penetrated water. One such method comprises a step of concentrically stranding core wires while coating the core wires with water repellent jelly (more particularly, a mixture of petrolatum or polybutene as a base, with petroleum wax, low molecular weight polyethylene, and an antioxidation agent), or in case of strand type cable or loose pipe type cable, the method comprises coating the pipe with the jelly. Since this method can sufficiently fill the jelly in the space between the core wires, it has large water penetration preventing effect. However, this method scarcely avoids the deterioration of working environment due to the drop of the jelly in the step of assembling the core wires.

In order to solve the problem of filling a vacancy in a cable with a jelly in situ for the stranded wires, there is also known a method of pressuring the above-described jelly in a vacancy within a cable core or a pipe containing a plurality of concentrically stranded core wires when a layer strand cable or loose pipe type cable is concerned. Further, there is known a method of pressuring a water repellent jelly into a vacancy in a cable which, in the case of a ribbon type cable, is a space between the laminate of the ribbon and a sheath or which, in the case of a slot ribbon type cable, is a space except the laminate in the slot of a core material or which, in the case of a slot type cable, is a space of the slot of the core material.

However, operability can be improved, but when the array of the core wires is dense, it is difficult to uniformly fill the vacancy within the cable with the jelly, and unfilled spaces tend to occur. In view of this point, the jelly is pressured in a heated state so as to increase the fluidity of the jelly, but after the jelly is pressured-in, void can be generated due to the thermal shrinkage of the jelly to form a water passage. On the other hand, if the pressuring-in is conducted under much increased pressure a problem could occur in case where the core wires are optical fibers, namely the characteristics of the fiber might be reduced.

In order to solve problems unavoidable for the method of pressuring-in of a water repellent jelly, it is proposed to add high water absorptive resin to the jelly. This method is advantageous in the improvement of water penetration preventive effect, but since hydrophilic, high water absorptive resin is dispersed in the oily jelly, oil content disturbs the water absorption so that the capacity of the high water absorptive resin is not sufficiently performed, thereby not completely solving it. In order to prevent the capacity of the high water absorptive resin from decreasing, there is also proposed a method of stranding core wires after coating the core wires with silicone oil and then putting a powder-like high water absorptive resin adhering to the wires. In this method, it is difficult to regulate the adhering amount of the high water absorptive resin powder, and working environment is deteriorated due to the scatter of the resin powder.

On the other hand, there is known a method of preventing water from penetrating to a cable by taping the outside of the core wire with a sheet which has a particulate form of the high water absorptive resin fixed with a binder to a base such as film or nonwoven fabric, which resin will swell upon contact with water which may have come into the cable. However, this method has some problems. That is, since the water absorptive resin is, in general, not fixed firmly to the base material, the resin tends to be frequently dropped at the time of manufacturing a cable, and, further, while a thin sheet is required for the core wire of small diameter, such a thin sheet is not easily manufactured.

SUMMARY OF THE INVENTION

Accordingly, an object of the present invention is to solve the above-described problems occurring in the related art and to hence provide a water penetration preventive cable in which the core wires or its assembly is coated with a tape of water absorptive resin complex (to be described in detail later) and a linear element of the complex is filled in vacancies between core wires or between core wire assemblies.

In order to achieve this and other objects, there is provided according to the present invention a water penetration preventive cable having an assembly of at least one linear element comprising a core wire and at least one linear element comprising a linear tensile strength member, the assembly being covered with a sheath to form the cable, characterized in that (1) at least one of the linear elements is wound with a water absorptive tape, and/or (2) a water absorptive linear element is interposed at least partly between said linear elements and/or between said linear element and said sheath, and/or (3) said assembly is wound with a water absorptive tape, and further in that (4) said water absorptive tape and said water absorptive linear element are made of a water absorptive polymer complex obtained by polymerizing a water soluble ethylenically unsaturated monomer impregnating or coated on a tapelike or a linear support or a support to be formed into a tapelike or linear shape.

In order to achieve this and other objects, there is provided according to another aspect of the present invention a water penetration preventive cable having a secondary assembly of linear elements comprising a plurality of primary assemblies and at least one optional element comprising a linear tensile strength member, the primary assembly being of at least one linear element comprising a core wire and at least one optional linear element comprising a linear tensile strength member, the secondary assembly being covered with a sheath, to form the cable characterized in that (1) at least one of the linear elements of the primary assemblies is wound with a water absorptive tape, and/or (2) a water absorptive linear element is interposed at least partly between the linear elements of the primary assemblies, and/or (3) at least one of the linear element of said second assembly is wound with a water absorptive tape, and/or (4) a water absorptive linear element is interposed at least partly between the linear elements of the second assembly and/or between the linear element of the second assembly and the sheath, and/or (5) the second assembly is wound with a water absorptive tape, and further in that the (6) said water absorptive tape and said water absorptive linear element are made of a water absorptive polymer complex obtained by polymerizing a water soluble ethylenically unsaturated monomer impregnating or coated on a tapelike or a linear support or a support to be formed into a tapelike or linear shape.

More particularly, another object of the present invention is to solve the above-described problems occurring in the related art and to hence provide a water penetration preventive layer-strand cable in which the core wires or its assembly is coated with a tape of water absorptive resin complex (to be described in detail later) and a linear element of the complex is put in and fills gaps between core wires or between core wire assemblies.

In order to achieve this and other objects, there is provided according to another aspect of the present invention a water penetration preventive layer-strand cable comprising linear elements comprising a plurality of core wires and at least one optional linear tensile strength element, an assembly of said linear elements being assembled and the assembly being covered with a sheath to form the cable characterized in that (1) at least one of the linear elements is wound with a water absorptive tape, (2) absorptive linear element is interposed at least partly between said linear elements and/or between said linear element and said sheath, and, (3) said assembly is wound with a water absorptive tape, and (4) said water absorptive tape and said water absorptive linear element are made of water absorptive polymer complex obtained by polymerizing a water soluble ethylenically unsaturated monomer impregnating or coated on a tapelike or linear support or a support to be formed into a tapelike or linear shape.

In order to achieve this and other objects, there is provided according to yet another aspect of the present invention a water penetration preventive layer strand cable comprising a secondary assembly of linear elements comprising a plurality of primary assemblies and at least one optional element comprising a linear tensile strength member, the primary assembly being of at least one linear element comprising a core wire and at least one optional linear element comprising a linear tensile strength member, the secondary assembly being covered with a sheath to form the cable, characterized in that (1) at least one of the linear elements of said primary assemblies is wound with a water absorptive tape, (2) an absorptive linear element is interposed at least partly in a gap between said linear elements of said primary assemblies and, (3) at least one of the linear elements of said second assembly is wound with a water absorptive tape, (4) a water absorptive linear element is interposed at least partly in a gap between linear elements of said second assembly and/or in a gap between the linear element of said second assembly and said sheath, and (5) said second assembly is wound with a water absorptive tape, and (6) said water absorptive tape and said water absorptive linear element are made of water absorptive polymer complex obtained by polymerizing a water soluble ethylenically unsaturated monomer impregnating or coated on a tapelike or linear support or a support to be formed into a tapelike or linear shape.

Accordingly, still another object of the present invention is to provide a water penetration preventive ribbon type cable in which the stack of the core wire ribbon or its assembly is wound with a tape of a water absorptive resin complex (to be described in detail later) and a linear element of the water absorptive resin complex is put to fill gaps between the laminate and the tape or between laminate assemblies and between the tapes.

In order to achieve this and other objects, there is provided according to yet another aspect of the present invention a water penetration preventive ribbon type cable comprising a stack of core wire ribbons covered with a sheath, the core wire ribbon being such that a plurality of core wires are aligned and the entire core wires are embedded in a flat plastics material, characterized in that at least one of the stacks of the core wire ribbons optionally with a water absorptive linear element is wound with a water absorptive tape, and/or, in the case where a plurality of the stacks is included, an assembly of the stacks together with a plurality of the water absorptive linear elements is wound with a water absorptive tape, and said water absorptive tape and said water absorptive linear element are made of water absorptive polymer complex obtained by polymerizing a water soluble ethylenically unsaturated monomer impregnating or coated on a tapelike or linear support or a support to be formed into a tapelike or linear shape.

Accordingly, still another object of the present invention is to provide a water penetration preventive slot ribbon type cable in which the core wires ribbon stack is wound with a tape of water absorptive resin complex (to be described in detail later), a linear element of the water absorptive resin complex is put to fill gaps in the slots of the core structure housing the stack, and the core structure is wound by a tape of the water absorptive resin complex.

In order to achieve this and other objects, there is provided according to yet another aspect of the present invention a water penetration preventive slot ribbon type cable comprising a stack of core wire ribbons, the core ribbon being such that a plurality of core wires are aligned and the entire core wires are embedded in a flat plastics material, the stack being housed in each of a plurality of slots formed longitudinally of the outer periphery of a core structure, the core structure being covered with a sheath to form the cable characterized in that at least one of the stack is wound with a water absorptive tape, and/or a water absorptive linear element is interposed at least partly in a gap in the slot of the core structure housing the stack, or/and the core structure housing the stack is wound with a water absorptive tape, said water absorptive tape and said water absorptive linear element are made of a water absorptive polymer complex obtained by polymerizing a water soluble ethylenically unsaturated monomer impregnating or coated on a tapelike or linear support or a support to be formed into a tapelike or linear shape.

Accordingly, still another object of the present invention is to provide a water penetration preventive slot type cable in which a core wire and a core structure of the slot type cable are wound with a tape of water absorptive resin complex (to be described in detail later) and a linear element of the water absorptive resin complex is put to fill gaps in the slots of the core structure housing the core wire.

In order to achieve this and other objects, there is provided according to yet another aspect of the present invention a water penetration preventive slot type cable comprising one or a plurality of core wires housed in a plurality of slots formed longitudinally of the outer periphery of a core structure, at least one of the core structures being covered with a sheath to form the cable characterized in that at least one of the core wires housed in the slot is wound with a water absorptive tape, and/or a water absorptive linear element is interposed at least partly in a gap in the slot housing the core wire, and/or the core structure as it is or as an assembly thereof is wound with a water absorptive tape, and, in the case where the core structure as an assembly thereof is wound with a water absorptive tape, the assembly is wound with the tape together with a water absorptive linear element, and said water absorptive tape and said water absorptive linear element are made of a water absorptive polymer complex obtained by polymerizing a water soluble ethylenically unsaturated monomer impregnating or coated on a tapelike or linear support or a support to be formed in a tapelike or linear shape.

Accordingly, still another object of the invention is to provide a water penetration preventive loose pipe type cable in which core wires or its assembly is wound with a tape of a water absorptive resin complex (to be described in detail later) and a linear element of the water absorptive resin complex is put to fill gaps between core wires or between core wire assemblies.

In order to achieve this and other objects, there is provided according to still another aspect of the invention a water penetration preventive loose pipe type cable comprising a plurality of linear elements comprising a plurality of pipes housing a core wire or wires of smaller outer diameter than the inner diameter of the pipe and at least one optional linear tensile strength element, the assembly plurality of linear elements being covered with a sheath to form the cable characterized in that at least one of the linear elements of the cable is wound with a water absorptive tape, and/or a water absorptive linear element is interposed at least partly in a gap between the linear elements and/or between the linear element and the sheath, and/or the assembly is wound with a water absorptive tape, said water absorptive tape and said water absorptive linear element are made of a water absorptive polymer complex obtained by polymerizing a water soluble ethylenically unsaturated monomer impregnating or coated on a tapelike or linear support or a support to be formed into a tapelike or linear shape.

In order to achieve this and other objects, there is provided according to still another aspect of the invention a water penetration preventive loose pipe type cable comprising a secondary assembly of linear elements comprising a plurality of primary assembly and at least one optional linear tensile strength member, the primary assembly being of a plurality of linear elements comprising a plurality of pipes housing a core wire or wires of smaller outer diameter than the inner diameter of the pipe and at least one optional linear tensile strength member, the assembly being covered with a sheath to form the cable, characterized in that at least one of the linear elements of the primary assembly is wound with a water absorptive tape, and/or a water absorptive linear elements is interposed at least partly in a gap between the linear elements of the primary assembly, and/or at least one of the linear elements of the secondary assembly is wound with a water absorptive tape, and or a water absorptive linear element is interposed at least partly in a gap between the linear elements and/or between the linear element and the sheath of the second assembly and/or the secondary assembly is wound with a water absorptive tape, and said water absorptive tape and said water absorptive linear element are made of a water absorptive polymer complex obtained by polymerizing a water soluble ethylenically unsaturated monomer impregnating or coated on a tapelike or linear support or a support to be formed into a tapelike or linear shape.

According to the present invention, "dried" water penetration preventive material is employed instead of water repellant jelly and the water penetration preventive material is disposed at the time of forming the cable. Therefore, the problems in the related art can be eliminated.

Since the water absorptive polymer complex (to be described in detail later) of the water penetration preventive material used in the present invention is rapidly swelled upon absorption of the water, the increase in the penetration of water into the cable can be effectively prevented, or water which may have come into the cable is effectively prevented from running further into the cable, by the pressure generated by the increase in the volume due to the swelling at the time of penetrating the water due to the damage of the sheath of the cable.

Other and further objects, features and advantages of the invention will appear more fully from the following description.

DESCRIPTION OF THE PREFERRED EMBODIMENTS

Figure 1:
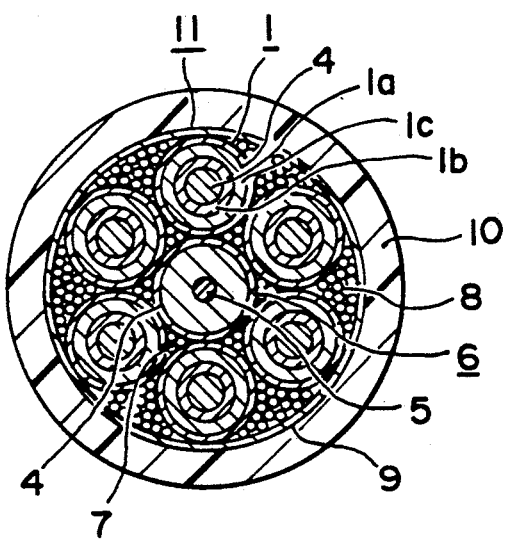
FIG. 1 is a sectional view showing an embodiment of an optical fiber of a water penetration preventive cable according to the present invention.

The present invention will be described in detail with reference to preferred embodiments.

I-1. Fundamental Constitution of Layer Strand Cable

A cable of the present invention as one aspect is of an assembly of linear elements containing a plurality of core wires and at least one optional linear tensile strength element and a sheath covering the assembly, and as another aspect is of an assembly of such cables, i.e., an assembly of the linear element (hereinafter referred to as "a secondary assembly") of linear elements containing a plurality of assemblies of the linear element (hereinafter referred to as "primary assemblies") containing a plurality of core wires and at least one optional linear tensile strength element and a sheath covering the secondary assembly.

Such a fundamental constitution of the cable is heretofore known.

The "core wire" is formed of metal wire made of copper or aluminum, etc. in case that the cable is of an electric wire, or formed of an optical fiber in case that the cable is for use in an optical communication. In case of the optical fiber, it may be conventional that the optical fiber is covered with a buffer layer (e.g., a flexible, ultraviolet-crosslinked plastic layer) to protect the optical fiber, and further provided with a coating made of a plastic, such as nylon or the like. In the present invention in this specification, such a structure is called "a core wire". The core wire is formed of a single wire or may be formed of a plurality of wires, or stranded wires, all of which are defined as "a core wire". It should be noted that a plurality of linear elements and core wires in particular to form an assembly can have different types, thicknesses or diameters.

Since optical fibers are normally weak against a tension, it is common to dispose in cables a linear tensile strength element made of a metal wire or the like so as to incorporate a necessary tensile strength as a cable. The linear tensile strength element is formed of a metal wire, or may be formed of a suitable coating (e.g., a buffer coating). The tensile strength necessary as the cable can alternatively be provided in the cable by disposing a linear tensile strength element in the sheath of the cable. One of the reasons why the linear tensile strength element is stated as being "optional" in the present invention is based on this alternative, and the "sheath" in the present invention is to be understood to include this alternative.

The above-mentioned linear elements may, as a mere bundle or preferably as a strand, make an assembly, or primary assembly, of the linear elements. It is noted that other linear elements matching the object of the present invention may also be further disposed as required in the primary assembly within the scope of the present invention.

An embodiment of a cable of such fundamental constitution is of a structure that a linear tensile strength element is disposed at a center as a central interposition and core wires are disposed around the linear tensile strength member to form an assembly, and a sheath covers the assembly (The details will be described later).

In another aspect of a water penetration preventive cable according to the present invention, an assembly of linear elements of the structure of the fundamental constitution shown above but without a sheath, which is called "a primary assembly," is assembled together with an optional linear tensile strength member into a further assembly, which is called "a secondary assembly" and the secondary assembly is covered by a sheath thereby to form a cable.

The primary assembly as a linear element of the secondary assembly and an optional linear tensile strength element are as described above with respect to the primary assembly, and assembling these linear elements into the secondary assembly by bundling or stranding these linear elements also stand explained except for replacing the description of the formation of the primary assembly with the "core wires" as the "primary assembly".

An embodiment of the cable of the fundamental constitution made of the secondary assembly is of a structure that the primary assembly having no linear tensile strength element is disposed around a linear tensile strength element to form an assembly, i.e. secondary assembly and a sheath covers the secondary assembly details will be described later).

In any constitution, the sheath for covering the outer periphery of a cable to protect the core wires and the assembly in the cable is formed of rubber, plastic, rubber or plastic impregnated cloth or other material, all heretofore known.

A process for producing a cable of such fundamental constitution is also heretofore known, and fundamentally has steps of forming an assembly by bundling or stranding the linear elements and applying a sheath thereon.

II-1. Water Penetration Preventive Layer Strand Cable

A water penetration preventive cable according to the present invention is characterized in that at least one of linear elements of the cable of any of the aspects of the fundamental constitutions described above (the primary assembly and an optional linear tensile strength element, in case of the secondary assembly) is wound with a water absorptive tape (details will be described later), an assembly (primary or secondary) to be covered with a sheath is wound with a water absorptive tape, and a water absorptive linear element (details will be described later) is interposed at least partly in a gap between the linear elements and/or between the linear element and the sheath.

Since the coating of the linear element with the water absorptive tape and the filling of the water absorptive linear element in the gap in the cable are conducted so that a water penetration preventing effect is recognized to a desired extent, at least one of the linear elements may be covered with the water absorptive tape. It is noted as described above that a plurality of linear elements to form an assembly may have different types and thicknesses or diameter. In this case, the water absorptive tape may be used only on the specific linear element selected. The core wires or the primary assembly not wound with the water absorptive tape may be covered with a conventional tape.

On the other hand, since it is a common practice that the water absorptive linear element is filled in the linear gap in the cable bundled or stranded together when the linear elements are bundled or stranded so as to be disposed in the cable, and that the water absorptive linear element may be further disposed in the gap between the assembly and the sheath on the outer periphery of the assembly followed by cover with a sheath, a necessary number of water absorptive linear elements, one or a plurality, may be used at the time of manufacturing the cable in view of volume to the gap to be formed.

Figure 2:
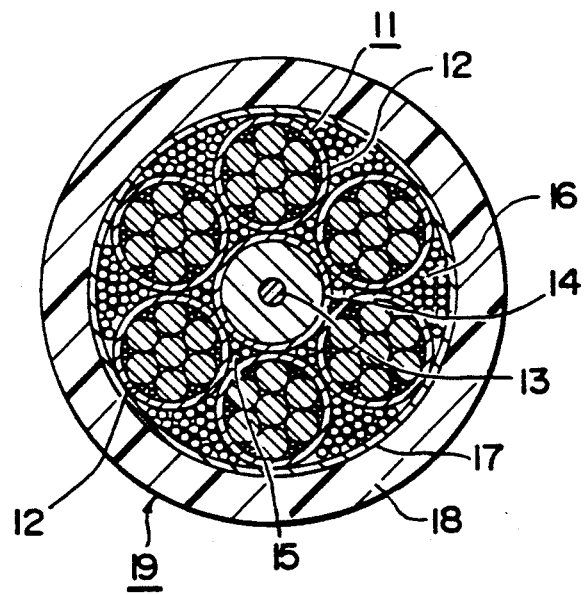
FIG. 2 is a sectional view showing an example of a unit strand cable with the water penetration preventive cable in FIG. 1 except its sheath housed in the cable as a unit.

FIGS. 1 and 2 are sectional views showing an embodiment of two types of a water penetration preventive layer strand cable according to the present invention, wherein FIG. 1 is of a first type, i.e. of a primary assembly, and FIG. 2 is of a second type, i.e. of a secondary assembly. These embodiments all have a structure that one linear tensile strength element is disposed at a center and core wires or primary assembly (without linear tensile strength element) is disposed on the periphery of the linear tensile strength element, and the core wires are covered with the water absorptive tape, the assembly is covered with the water absorptive tape, and the water absorptive linear element is applied to fill the gap within the cable to the maximum limit, which structure is a typical embodiment of the present invention although the present invention is not limited to the particular embodiment.

The water penetration preventive layer strand cable according to the present invention may be manufactured by a conventional method of manufacturing a cable of the above described fundamental constitution, which comprises steps of winding the water absorptive tape on the core wire(s) or the primary assembly (winding of the tape is known as a unit step in conventional manufacture of cables) and bundling or stranding the core wires and/or the primary assembly together with the water absorptive linear element.

I-2. Fundamental Constitution of Ribbon type Cable

Another aspect of a cable of the present invention is of a ribbon type cable. As described above, a plurality of core wires are aligned in parallel, the entire core wires are embedded in a plastics material in a flat state to form a core wire ribbon, and a plurality of the core wire ribbons are superposed as a stack, and at least one of the is covered with a sheath.

Such a fundamental constitution of cables is heretofore known.

The "core wire" is formed of metal wire made of copper or aluminum, etc. in case that the cable is of an electric wire, or formed of an optical fiber in case that the cable is for use in an optical communication. The ribbon type cable is particularly adapted as the cable state for an optical fiber. In case of the optical fiber, the optical fiber element is covered with a buffer layer (e.g., a flexible, ultraviolet-crosslinked plastic layer) to protect the optical fiber element, and further provided with a coating made of a plastic, such as nylon or the like. In the present invention in this specification, such a structure is called "a core wire". The core wire is formed of a single wire or may be formed of a plurality of wires, or twisted wires, all of which are defined as "a core wire". In this case, core wires may have different types, thicknesses or diameters.

A plurality of such core wires are aligned in parallel, the entire core wires are covered with or embedded in a plastic material in a flat state to form a core wire ribbon or a core wire tape), a plurality of the core wire ribbons are superposed as a stack, one or more such stacks are gathered and covered with a sheath as a ribbon type cable. The "plastic" for forming the ribbon has preferably sufficient flexibility. Accordingly, it contains rubberlike plastic and rubber.

Since the optical fibers are normally weak against a tension even if they are formed in a ribbon or in a stack of the ribbons, it is a common practice to dispose a linear tensile strength element made of a metal wire or the like so as to provide the cable with a necessary tensile strength. The linear tensile strength element is a metal wire itself, or may be so-called a central interposition which is a metal wire covered with a suitable coating such as e.g., a buffer coating. The tensile strength necessary as a cable can be provided by disposing a linear tensile strength element not in the inside of but in the sheath of the cable. The present invention belongs to the category of a known ribbon type cable as long as a type of cables is concerned, and it is thus to be understood that use of such tensile strength element is within the purview of the present invention.

In one aspect of an embodiment of the ribbon type cable of such fundamental constitution, the structure is such that a linear tensile strength element is disposed in a sheath; and in another aspect of the embodiment, the structure is such that a linear tensile strength element is disposed at a center as a central interposition and core wire ribbon stacks are disposed around the linear tensile strength element to form an assembly, and the assembly is covered by a sheath (the details will be described later). The former is adapted for the case where only one stack of the core wire ribbon is used, and the latter is adapted for the case of a plurality of the stacks used.

In any constitution, the sheath to protect the core wire ribbon is formed of rubber, plastic, rubber or plastic impregnated cloth or other material, all heretofore known.

A process for producing the cable of such fundamental constitution is also heretofore known, and fundamentally comprises steps of forming a stack of the core wire ribbon or, in some cases, forming an assembly by bundling or stranding a plurality of the stacks, and putting a sheath thereon as a covering.

II-2. Water Penetration Preventive Ribbon type Cable

A water penetration preventive ribbon type cable according to the present invention is characterized in that at least one of laminates of core wire ribbons of a ribbon type cable of the fundamental constitution described above is wound, as such or together with a water absorptive linear element (details will be described later), with a water absorptive tape (details will be described later), and in case where a plurality of the stacks are used, the stacks are together with a plurality of the water absorptive linear elements, wound with a water absorptive tape.

More specifically, the stack is made "waterproof" (a) by winding directly a water absorptive tape around it, or (b) winding a water absorptive tape around a bundle of the stack and a water absorptive linear element, or (c) winding a water absorptive tape around the stack itself and further winding a water absorptive tape around a bundle of the stack and a water absorptive linear element.

The covering of the core wire ribbon stack with the water absorptive tape and the adding of the water absorptive linear element in the gap within the covering tape are practiced as long as a water penetration preventing effect is attained to a desired degree, and, in the case where the cable is formed of a plurality of the stacks of the core wire ribbons, at least one of the stacks may be made water proof by at least one of the means for making water proof (a) to (c), preferably the means (c).

When the cable is formed of a plurality of the stacks of core wire ribbons, the assembly of the stacks is wound, together with a linear water absorptive element or elements, with a water absorptive tape.

When a plurality of the stacks of the core wire ribbon are assembled and the assembly is wound with the water absorptive tape and when the water absorptive linear element is to fill the linear space within the covered assembly of the stacks, it may be a common practice that the water absorptive tape is bundled or strained together with the core wire ribbon stacks and, in some cases, the linear tensile strength element when the stacks (and the linear tensile strength element) are bundled or stranded to form a cable, and accordingly a necessary number (one or a plurality) of water absorptive linear elements may be used at the time of manufacturing the cable with due consideration of the volume of the gap to fill.

Figure 3:
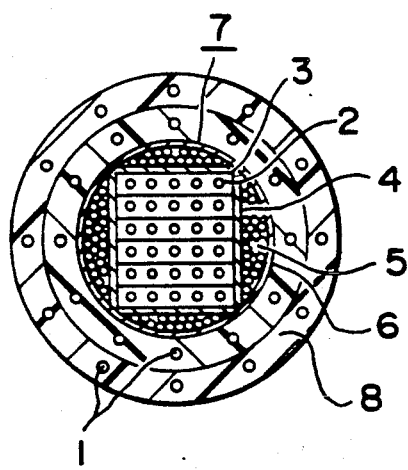
FIG. 3 is a sectional view showing another embodiment of an optical fiber of a water penetration preventive ribbon type cable according to the present invention.
Figure 4:
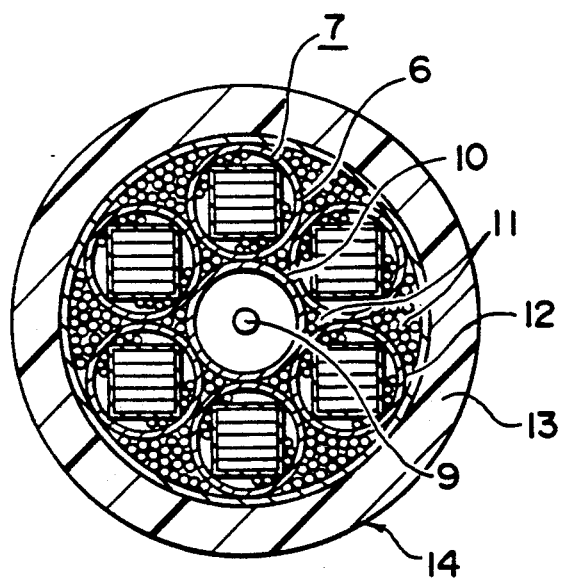
FIG. 4 is a sectional view showing an example of a unit strand cable with the water penetration preventive cable in FIG. 3 except its sheath housed in the cable as a unit.

FIGS. 3 and 4 are sectional views showing an embodiment of two types of a water penetration preventive ribbon type cable according to the present invention, wherein FIG. 3 is of a first type, i.e. of one core wire ribbon stack, and FIG. 4 is of a second type i.e. of a plurality of stacks. These embodiments all have stacks or an assembly thereof covered with the water absorptive tape, and filling with water absorptive linear elements of the gap within the covered stacks or assembly to the maximum degree, which is a typical embodiment of the present invention, although the present invention is not limited to the particular embodiment. The water penetration preventive ribbon type cable according to the present invention can be manufactured by a conventional method of manufacturing the above-described cable of the fundamental constitution, which comprises steps of winding the water absorptive tape around the core wire ribbon stack or the assembly (winding of a tape around core wires is known as a unit step in the conventional manufacture of cables) and bundling or stranding the stacks and/or the assembly together with the water absorptive linear element.

I-3. Fundamental Constitution of Slot Ribbon type Cable

Yet another aspect of a cable of the present invention is of a slot ribbon type cable, and, as described above, a plurality of core wires are aligned in parallel, the entire core wires are coated with or embedded in a plastic material in a flat state to form a core wire ribbon, and a stack of the ribbons is housed in a slot formed longitudinally on the outer periphery of the core structure, which is covered with a sheath.

Such a fundamental constitution of the cable is heretofore known.

The "core wire" is formed of metal wire made of copper or aluminum, etc. in case that the cable is of an electric wire, or formed of an optical fiber in case that the cable is for use in an optical communication. The slot ribbon type cable is particularly adapted as a cable for an optical fiber. In case of the optical fiber, the optical fiber is covered with a buffer layer (e.g., a flexible ultraviolet-crosslinked plastic layer) to protect the optical fiber, and further provided with a coating made of a plastic, such as nylon or the like. In the present invention in this specification, such a structure is called "a core wire". The core wire is formed of a single wire or may be formed of a plurality of wires, or stranded wires, all of which are defined as "a core wire". In this case, core wires may have different types, thicknesses or diameter.

A plurality of such core wires are aligned in parallel, the entire core wires are covered with or embedded in a plastic material in a flat state to form a core wire ribbon or core wire tape, and a plurality of the core wire ribbons are superposed to form a stack, the stack is contained in a slot of the core structure to form a slot ribbon type cable.

Since the optical fibers are normally weak against a tension even if they are formed in a ribbon or in a structure, it is reasonable to house the stack in a slot of a core structure to form a cable but the cable may still be weak against a tension.

In order to provide a cable with tensile strength required for a cable, it is a common practice to dispose a linear tensile strength element made of metal wire or the like within the core structure. The linear tensile strength element may be a metal wire itself, or may be one having a suitable covering (e.g., a buffer covering). The tensile strength necessary as the cable can be provided also by disposing a linear tensile strength element in the slot of the core structure or in the sheath of the cable.

In any constitution, the sheath to protect the core wire ribbon is formed of rubber, plastic, rubber or plastic impregnated cloth or other material, all heretofore known.

A process for producing the slot ribbon type cable of such fundamental constitution is also heretofore known, and fundamentally comprises steps of forming a stack of the core wire ribbons, introducing it to the slot of the core structure and covering the core structure with a sheath.

II-3. Water Penetration Preventive Slot Ribbon type Cable in accordance with the present invention.

A water penetration preventive slot ribbon type cable according to the present invention is characterized in that at least one of stacks of core wire ribbons of a slot ribbon type cable of the fundamental constitution described above is wound with a water absorptive tape, and/or a water absorptive linear element is interposed at least partly in a gap within the slot of the core structure or/and, the core structure is wound with the water absorptive tape.

The water absorptive linear element for filling the gap within the slot of the core structure of the cable, i.e., the linear gap, may be put to its place at the time of manufacturing the cable where a necessary number (one or a plurality) of water absorptive linear elements is used in view of the volume of the gap formed in the slot to be filled.

Figure 5:
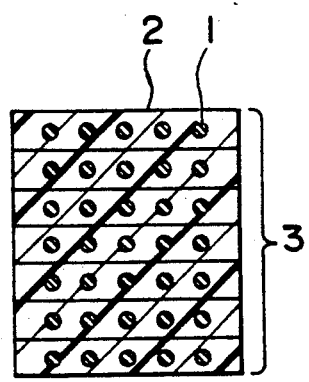
FIG. 5 is a sectional view of yet another embodiment of a stack of an optical fiber ribbon of a water penetration preventive slot ribbon type cable according to the present invention.
Figure 6:
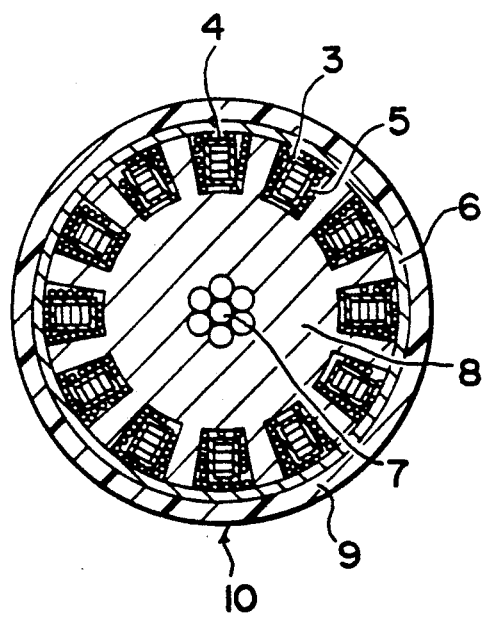
FIG. 6 is a sectional view showing an example of a water penetration preventive slot ribbon type cable according to the present invention.

FIGS. 5 and 6 are sectional views showing still another embodiment of a water penetration preventive slot ribbon type cable according to the present invention, wherein FIG. 5 is of a core wire ribbon stack, and FIG. 6 is of a plurality of ribbon stacks in the slot of the core structure. The embodiment of FIG. 6 has covering of core wire ribbon structures with the water absorptive tape and filling with a water absorptive linear element of the gap within the cable made to the maximum degree, which is a typical embodiment of the present invention, although the present invention is not limited to the particular embodiment.

The water penetration preventive slot ribbon type cable according to the present invention can be manufactured by a conventional method of manufacturing a cable of the fundamental constitution given above, which comprises steps of winding the water absorptive tape around the core wire ribbon stack and the core structure (winding of a tape around wires is known as a unit step in the manufacture of cables) and putting the core wire ribbon stack in the slot of the core structure together with the water absorptive linear element.

I-4. Fundamental Constitution of Slot type Cable

Still another aspect of a cable of the present invention is of a slot type cable, and, as described above, in a structure that one or a plurality of core wires are collectively contained in a plurality of slots formed longitudinally of the outer periphery of the core structure, and one or a plurality of such core structures are collectively covered with a sheath.

Such a fundamental constitution of the cable is heretofore known.

The "core wire" is formed of metal wire made of copper or aluminum, etc. in case that the cable is of an electric wire, or formed of an optical fiber in case that the cable is for use in an optical communication. The slot type cable is particularly adapted as the cable for an optical fiber. In case of the optical fiber, the optical fiber is covered with a buffer layer (e.g., a flexible ultraviolet-crosslinked plastic layer) to protect the optical fiber, and further provided with a coating made of a plastic, such as nylon or the like. In the present invention in this specification, such a structure is called "a core wire". The core wire is formed of a single wire or may be formed of a plurality of wires, or stranded wires, all of which are defined as "core wire". In this case, a core wires may have different types, thicknesses or diameters.

One or a plurality of such core wires are collectively contained in the slot of the core structure as a slot type cable. The core wires of such a constitution are covered with a sheath as one or a plurality collectively as a slot type cable.

Since the optical fibers are normally weak against a tension, it may be reasonable to house the stack of ribbons in the slot of the core structure to form a cable but the cable is still weak against a tension. In order to provide the cable with tensile strength necessary for a cable, it is a common practice to dispose a linear tensile strength element made of metal wire or the like within the core structure. The linear tensile strength element may be a metal wire itself, or may be one having a suitable covering (e.g., a buffer covering). The tensile strength necessary as the cable can be provided by disposing a linear tensile strength element within the core material or in the slot of the core material or in the sheath of the cable, or in the case of a plurality of the core structures used, the tensile strength element is disposed in a bundle with the core structure at the time when the core structure is covered with the sheath, or disposed in the sheath.

In any constitution, the sheath to protect the core wire and the core material is formed of rubber, plastic, rubber or plastic-impregnated cloth or other material, all heretofore known.

A process for producing the slot type cable of such fundamental constitution is also heretofore known, and fundamentally has steps of introducing the core wire (one or a plurality) in the slot of the core structure and covering a sheath thereon.

II-4. Water Penetration Preventive Slot type Cable

A water penetration preventive slot type cable according to the present invention is characterized in that one and/or a plurality of core wires of a slot type cable of the fundamental constitution described above are collectively wound with a water absorptive tape, and-/or a water absorptive linear element is interposed at least partly in a gap within the slot of the core structure, and/or one and or a plurality of core structures are collectively wound with the water absorptive tape, and/or, in the case where a plurality of the core structures are used, an assembly of the core structures is wound with the water absorptive tape together with water absorptive linear element.

The water absorptive linear element for filling the slot of the core structure of the cable, i.e., the linear gap and, in case of a plurality of core wires used, a water absorptive linear element to exist together with an assembly of the plurality of core wires when the assembly is wound with the water absorptive tape, may be used in a necessary number (one or a plurality) of water absorptive linear elements at the time of manufacturing the cable with consideration of the volume of the gap formed in the slot or between the core materials to dispose it in the cable.

Figure 7:
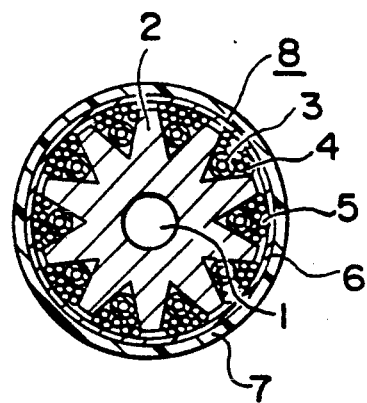
FIG. 7 is a sectional view showing still another embodiment of an optical fiber of a water penetration preventive slot type cable according to the present invention.
Figure 8:
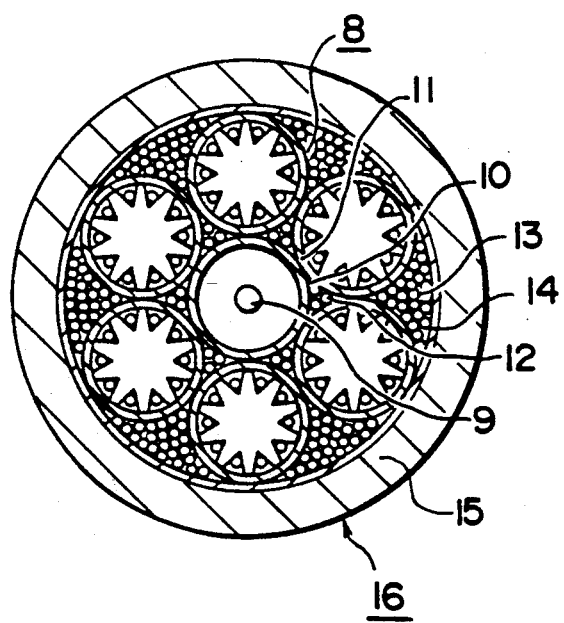
FIG. 8 is a sectional view showing an example of a unit strand cable with the water penetration preventive cable in FIG. 7 except its sheath housed in the cable as a unit.

FIGS. 7 and 8 are sectional views showing still another embodiment of two types of a water penetration preventive slot type cable according to the present invention, wherein FIG. 7 is one type made of a one core structure, and FIG. 8 is another type made of a plurality of core structures. These embodiments have covering of core wires or core structures with the water absorptive tape, and filling the gap in the cable with the water absorptive linear element is made to the maximum degree, which is the typical embodiment of the present invention, although the present invention is not limited to the particular embodiment.

The water penetration preventive slot type cable according to the present invention can be manufactured by a conventional method of manufacturing the cable of the fundamental constitution given above, which comprises the steps of winding the water absorptive tape around the core wire ribbon and the core structure (winding of a tape is known as a unit step in the manufacture of cables) and putting the core wire in the slot of the core structure together with the water absorptive linear element and winding of the water absorptive tape around the core structures together with the water absorptive linear element in case of a plurality of the core structures used.

I-5. Fundamental Constitution of Loose Pipe type Cable

Still another aspect of a cable of the invention comprises an assembly of a plurality of pipes containing a core wire (the inner diameter of the pipe is larger than the outer diameter of the core wire contained in the pipe) and an optional linear element containing at least one linear tensile strength element as a linear element and a sheath covering the assembly. Another embodiment of this aspect of the cable corresponds to the assembly of the cable, and comprises a plurality of assemblies (hereinafter referred to as "primary assembly") of linear elements containing a plurality of pipes containing a core wire and at least one linear tensile strength element as a linear element, which assemblies together with at least one optional linear tensile strength element as a linear element are assembled to form an assembly (hereinafter referred to as "secondary assembly") with a sheath covering the secondary assembly to form the cable.

Such a fundamental constitution of the cable is heretofore known.

The "core wire" is formed of metal wire made of copper or aluminum, etc. in case that the cable is of an electric wire, or formed of an optical fiber in case that the cable is for use in an optical communication. The loose pipe type cable is particularly adapted as the cable for an optical fiber. In case of the optical fiber, the optical fiber is covered with a buffer layer (e.g., a flexible ultraviolet-crosslinked plastic layer) to protect the optical fiber, and further provided with a covering made of a plastic, such as nylon or the like. In the present invention in this specification, such a structure is called "a core wire". The core wire is formed of a single wire or may be formed of a plurality of wires, or strand wires, all of which are defined as "a core wire". A plurality of linear elements to form an assembly and particularly core wires may have different types, thicknesses or diameters.

The loose pipe type cable has a structure such that in a pipe which is normally made of a plastic, plastics having suitable elasticity being preferable, are placed core wires referred to above "loosely" and hence in a "loose" state, and the pipes are formulated into a cable as if the pipes correspond to the core wires of the conventional strand cable. In the present invention, this pipe as well as a linear tensile strength element to be used in some cases optionally is called "linear element" of a cable.

Since the optical fibers are normally weak against a tension, it is a common practice, in order to provide tensile strength necessary as a cable, to dispose a linear tensile strength element made of metal wire or the like in the core structure. The linear tensile strength element is formed of a metal wire, or may be formed of (so-called a central interposition of) a suitable covering (e.g., a buffer covering). The tensile strength necessary as the cable can be provided by disposing a linear tensile strength element in the sheath. One of the reasons why the linear tensile strength element is called "optional" resides in this structure, and the "sheath" in the present invention is understood to be not only a mere covering but a kind of a strength member.

The above-mentioned linear elements may be formed as a mere bundled state or preferably stranded state as an assembly (primary assembly) of the linear elements. It is noted that other linear element matching the object of the present invention may also be further disposed as required in the primary assembly within the scope of the present invention.

An embodiment of a cable of such fundamental constitution is of a structure that a linear tensile strength element is disposed at a center as a central interposition and core wires are disposed around the linear tensile strength element as an assembly, and a sheath covering the assembly (The details will be described later).

Another aspect of a water penetration preventive cable according to the present invention has as a fundamental constitution a structure that a cable of the above-described fundamental constitution without sheath (primary assembly) and an optional linear tensile strength element as a linear element are assembled, and the assembly thus formed (secondary assembly) is covered with a sheath.

The primary assembly of the linear element of the secondary assembly and the optional linear tensile strength element are as described above with respect to the primary assembly, and the formation of the assembly (secondary assembly) formed by bundling or stranding these linear elements stand explained if the description of the formation of the primary assembly given above is read with the "core wires" replaced by the "primary assembly".

An embodiment of the cable of the fundamental constitution made of the secondary assembly is of a structure that the primary assembly having no linear tensile strength element is disposed around the linear tensile strength element as an assembly (secondary assembly) and a sheath covering the secondary assembly (details will be described later).

In any constitution, the sheath to protect the core wires and the assembly covering the outer periphery of the cable is formed of rubber, plastic, rubber or plastic impregnated cloth or other material, all heretofore known.

A process for producing the loose pipe type cable of such fundamental constitution is also heretofore known, and fundamentally has steps of introducing the core wire into the pipe, forming an assembly by bundling or stranding the linear elements, i.e. the pipes and an optional tensile strength element and covering the assembly with a sheath.

II-5. Water Penetration Preventive Loose Pipe type Cable

A water penetration preventive cable according to the present invention is characterized in that at least one of linear elements of the cable of any of the aspects of the fundamental constitutions described above (the primary assembly and the optional linear tensile strength element, in case of the secondary assembly) is wound with a water absorptive tape (details will be described later), an assembly (primary or secondary) to be covered with a sheath is wound with a water absorptive tape, and/or a water absorptive linear element (details will be described later) is interposed at least partly in a gap between the linear elements and or between the linear element and the sheath.

Since the covering of the linear element with the water absorptive tape and the filling with the water absorptive linear element of the gap in the cable are practiced to an extent that a water penetration preventing effect is attained, at least one of the linear elements may be covered with the water absorptive tape. It is noted as described above that a plurality of linear elements to form an assembly may have different types and thicknesses or diameters. In this case, the water absorptive tape may be wound around a specific linear element only. The core wires or the primary assembly not wound with the water absorptive tape can be covered with a conventional tape.

On the other hand, since the water absorptive linear element to fill the linear gap in the cable is usually bundled or stranded together when the linear elements are bundled or stranded so as to be disposed in the cable, (the water absorptive linear element may be further disposed in the gap between the assembly and the sheath on the outer periphery of the assembly and covered with a sheath), a necessary number (one or a plurality) of water absorptive linear elements may be used at the time of manufacturing the cable by considering the air gap to be formed.

Figure 9:
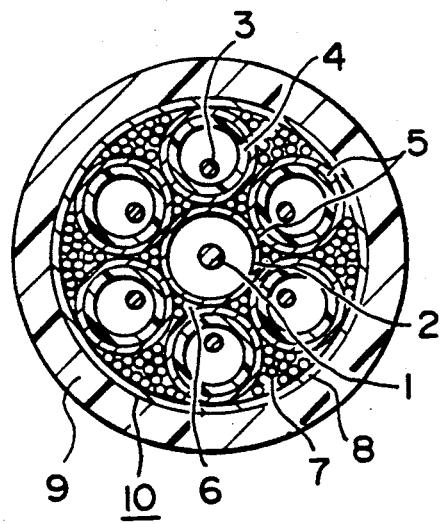
FIG. 9 is a sectional view showing another embodiment of an optical fiber of a water penetration preventive loose pipe type cable according to the present invention.
Figure 10:
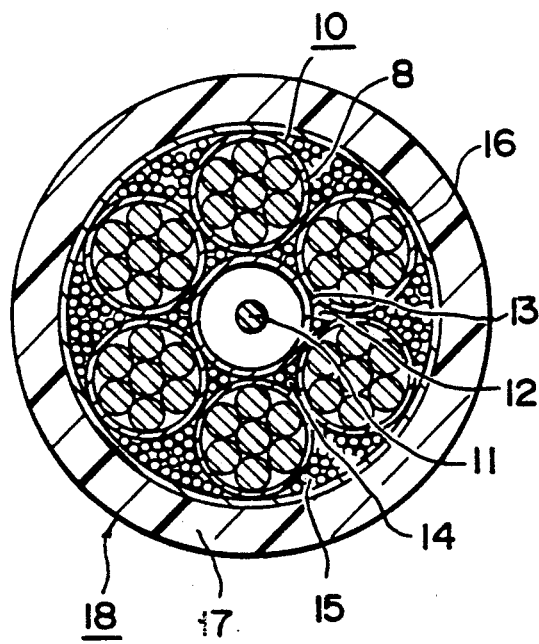
FIG. 10 is a sectional view showing an example of a unit twisted cable with the water penetration preventive loose pipe type cable in FIG. 9 except its sheath housed in the cable as a unit.

FIGS. 9 and 10 are sectional views showing still another embodiment of two types of a water penetration preventive cable according to the present invention, wherein FIG. 9 is of a first type made of a primary assembly, and FIG. 2 is of a second type made of a secondary assembly. These embodiments all have a structure that one linear tensile strength element is disposed at a center and core wires or primary assembly (without linear tensile strength element) is disposed on the periphery of the linear tensile strength element, and that the core wire-containing pipes or their assembly are (is) wound with the water absorptive tape and the water absorptive linear elements fill the gap in the cable to the maximum extent, which is the typical embodiment of the present invention, although the present invention is not limited to the particular embodiment.

The water penetration preventive loose pipe type cable according to the present invention can be manufactured by a conventional method of manufacturing the above-referred cable of the fundamental constitution, which comprises the steps of winding the water absorptive tape around the core wire-containing pipe or its primary assembly (winding of a tape is known as a unit step in the manufacture of cables) and bundling or stranding the core wire containing pipe and/or the primary assembly thereof together with the water absorptive linear element.

III. Water absorptive tape and Water absorptive linear element

In the present invention as the water penetration preventive material is employed a water absorptive polymer complex obtained by polymerizing a water soluble ethylenically unsaturated monomer impregnating or coated on a tapelike, or linear support or a support to be formed in a tapelike or linear shape.

The aqueous soluble ethylenically unsaturated monomer includes acrylic acid or methacrylic acid (the acryl or methacryl moiety hereinafter is referred to as "(meth)acryl") or its partially or totally neutralized products (e.g., alkaline metal salt or ammonium salt), (meth)acrylamide, N-methylol(meth)acrylamide, ethyleneglycol mono(meth)acrylate, vinylsulfonic acid, etc. The (meth)acrylic acid or its neutralized product (particularly those whose 20% or more of carboxyl groups have been neutralized) is particularly preferable.

In order to impart desired water insolubility to hydrophilic polymer produced by the polymerization of these monomers as shown above, a crosslinking monomer can be copolymerized, and such crosslinking monomer includes N,N'-methylenebis-(meth)acrylamide, polyethyleneglycol di(meth)acrylates glycerin di- or tri(meth)acrylate, etc. In addition to crosslinking monomers other monomers suitable to the object of the invention and such copolymers are hence comprised in "water absorptive polymer complex obtained by polymerizing a water soluble monomer".

The support to carry on it these monomers to form a water absorptive polymer complex is in a tapelike or linear shape or in a form to be processed into a tapelike or linear shape of a fibrous or spongy product made of an absorptive material or a nonabsorptive material. More particularly, it includes nonwoven fabric, woven or knitted fabric, sponge (which means not only sponge in the narrow definition, but includes widely elastic porous materials, continuously porous material being desirable.), plastic film, etc. The support may be formed into a tapelike or linear piece of necessary size before or after the polymerizing step conducted thereon.

The monomer is polymerized on such a support by any suitable process matching the object of the invention. A typical process comprises the steps of impregnating or coating the support with an aqueous monomer solution, or spraying the monomer solution on the support; and initiating polymerization by generating free radicals by decomposing a radical polymerization initiator which has been dissolved in the aqueous monomer solution (e.g., by heating, or, in case that the dissolved polymerization initiator is an oxidizing component of a redox combination, by adding a reducing component) or by irradiating the monomer with high energy radioactive ray or by any suitable step for initiating the polymerization. The way of adding the free radical polymerization initiator is not critical. For example, it may be dissolved in the monomer solution or radical polymerization initiator solution is sprayed to the support coated with the monomer, or the monomer solution may reversely be sprayed to the support coated with the radical polymerization initiator. After the polymerization is finished, the polymer-support complex is dried, shredded and subjected to other optional steps desired to obtain tapelike or linear element. The content of the water absorptive polymer in the support is normally 1 to 1000% by weight of the support, and preferably 10 to 100% by weight.

The tape and the linear element may not always be made of the same material for a given cable. For example, the tape is formed of a nonwoven fabric as a support, and the linear element is formed of a sponge as a support.

IV. Examples

The Examples exhibit the water penetration preventing effect of the tapelike or linear water absorptive polymer complex of the water penetration preventive cable of the type of the embodiments described above.

Aqueous potassium acrylate solution of the degree of neutralization of 70 mol-% of 63% by weight of solid content was prepared. 0.4% by weight of N,N'-methylenebisacrylamide and 0.3% by weight of potassium persulfate to the potassium acrylate monomer were dissolved in this solution, and a nonwoven fabric of polyester fibers ("Marix 90403WSO" manufactured by Unitika, Ltd., Japan) of a basis weight of 40 g/m$^2$ was impregnated uniformly with the aqueous solution of 50 g/m$^2$ of polymer quantity.

On the other hand, a stringlike element made of polyester fibers of dimensions of 1 mm × 100 m was impregnated with the monomer solution to a level of 0.5 g/g of polymer quantity, and wound on a mesh mandrel made of Teflon.

These monomer-impregnated materials were placed in an oven in which the air was substituted with nitrogen, left to stand for 1 hour to polymerize the monomer, and were subjected to drying under reduced pressure and at 100° C., whereby a water absorptive sheet and linear elements made of water absorptive polymer complex were obtained. This sheet was shredded into 2 cm of width to give a water absorptive tape.

A rod of low density polyethylene (8 mm in diameter ×approx. 7 m) was prepared, the water absorptive tape of 2 cm width was wound around it at a predetermined pitch, cut into seven pieces of a length of 1 m. The seven pieces were used as core wire equivalents.

These seven pieces were bundled so that one of these pieces was disposed at a center, 6 pieces were disposed around the center, and the water absorptive linear elements in the gaps therein in the same direction, the bundle was tied up, and the water absorptive linear elements were further aligned and buried in the recess on the outer periphery of the bundle in the same direction, followed by winding around it with the water absorptive tape. The formed assembly was covered with a polyethylene covering of 2 mm thick.

The obtained cable equivalent was disposed horizontally, and water pressure of 0.1 kg/cm$^2$ was applied to one of its ends, thereby to carry out a test for its waterproofness at ambient temperature. Even after 6 hours were elapsed, no water was dropped from the other end as the result of running of water through the gaps between the polyethylene pieces of the cable equivalent.

As described above, the water penetration preventive cable according to the present invention, even if water is penetrated due to the damage of the sheath, it was confirmed that the effect of preventing the penetration of the water was presented. Further, no stick-like water repellent jelly existed for preferable manufacturing work.

DETAILED DESCRIPTION OF THE DRAWINGS

The parts or members shown in FIGS. 1 through 10 are as follows.

FIGS. 1 and 2

1: core wire; 1a: optical fiber; 1b: buffer covering; 1c: plastics covering; 4, 9, 12, 17: water absorptive tape; 5, 13: tensile strength element; 6, 14: central interposition; 7, 8, 15, 16: water absorptive linear element; 10, 18: outer covering/sheath; 11: cable unit/primary assembly; 19: unit strand cable.

FIGS. 3 and 4

1, 9: tensile strength element; 2: optical fiber core wire; 3: ribbon; 4, 6, 12: water absorptive tape; 5, 11: water absorptive linear element; 7: ribbon type cable unit/primary assembly; 8, 13: outer covering/sheath; 10: central interposition; 14: water penetration preventive unit ribbon type cable/secondary assembly.

FIGS. 5 and 6

1: core wire; 2: core wire ribbon; 3: stack of ribbon; 4, 6: water absorptive tape; 5: water absorptive linear element; 7: tensile strength element; 8: core structure with slots; 9: outer covering/sheath; 10: water penetration preventive slot ribbon type cable.

FIGS. 7 and 8

1, 9: tensile strength element; 2: core structure with V-slots; 3: core wire; 4, 6, 11, 14: water absorptive tape; 5, 12, 13: water absorptive linear element; 7, 15: outer covering/sheath; 8: V-slot type cable unit; 10: central interposition; 16: V-slot unit type cable.

FIGS. 9 and 10

1, 11: tensile strength element; 2, 12: central interposition; 3: core wire; 4: plastics pipe; 5, 8, 13, 16: water absorptive tape; 6, 7, 14, 15: water absorptive linear element; 9, 17: outer covering/sheath; 10: loose pipe type cable unit/primary assembly; 18: loose pipe type unit cable.

What is claimed is:

1. A water penetration preventive cable comprising an assembly of at least one linear element comprising a core wire and at least one linear element comprising a linear tensile strength member, the assembly being covered with a sheath to form the cable, wherein at least one of the linear elements is wound with a water absorptive tape, a water absorptive linear element is interposed at least partly between said linear elements or between one said linear element and said or said assembly is wound with a water absorptive tape, and further wherein said water absorptive tape is made of a water absorptive polymer complex obtained by polymerizing a water soluble ethylenically unsaturated monomer impregnating or coated on a tapelike support.

2. A water penetration preventive cable as recited in claim 1, wherein the water soluble ethylenically unsaturated monomer is selected from the group consisting of acrylic acid, an alkali metal salt of acrylic acid, an ammonium salt of acrylic acid, methacrylic acid, an alkali metal salt of methacrylic acid, a ammonium salt of methacrylic acid, acrylamide, methacrylamide, N-methylolacrylamide, N-methylolmethacrylamide, ethyleneglycol monoacrylate and ethyleneglycol monomethacrylate.

3. A water penetration preventive cable as recited in claim 1, wherein the water soluble ethylenically unsaturated monomer is selected from the group consisting of acrylic acid, an alkali metal salt of acrylic wherein at least 20% of the carboxyl groups have been neutralized, an ammonium salt of acrylic acid wherein at least 20% of the carboxyl groups have been neutralized, methacrylic acid, an alkali metal salt of methacrylic acid wherein at least 20% of the carboxyl groups have been neutralized, and an ammonium salt of methacrylic acid wherein at least 20% of the carboxyl groups have been neutralized.

4. A water penetration preventive cable comprising a secondary assembly of linear elements comprising a plurality of primary assemblies and at least one element comprising a linear tensile strength member, each said primary assembly including at least one linear element comprising a core wire and at least one linear element comprising a linear tensile strength member, the secondary member being covered with a sheath to form the cable, wherein at least one of the linear elements of the primary assemblies is wound with a water absorptive tape, or at least one of the linear elements of said secondary assembly is wound with a water absorptive tape, or the secondary assembly is wound with a water absorptive tape, and further wherein said water absorptive tape is made of a water absorptive polymer complex obtained by polymerizing a water soluble ethylenically unsaturated monomer impregnating or coated on a tapelike support.

5. A water penetration preventive cable as recited in claim 4, wherein the water soluble ethylenically unsaturated monomer is selected from the group consisting of acrylic acid, an alkali metal salt of acrylic acid, an ammonium salt of acrylic acid, methacrylic acid, an alkali metal salt of methacrylic acid, an ammonium salt of methacrylic acid, acrylamide, methacrylamide, N-methylolacrylamide, N-methylolmethacrylamide, ethyleneglycol monoacrylate and ethyleneglycol monomethacrylate.

6. A water penetration preventive cable as recited in claim 4, wherein the water soluble ethylenically unsaturated monomer is selected form the group consisting of acrylic acid, an alkali metal salt of acrylic acid wherein at least 20% of the carboxyl groups have been neutralized, an ammonium salt of acrylic acid wherein at least 20% of the carboxyl groups have been neutralized, methacrylic acid, an alkali metal salt of methacrylic acid wherein at least 20% of the carboxyl groups have been neutralized, and an ammonium salt of methacrylic acid wherein at least 20% of the carboxyl groups have been neutralized.

7. A water penetration preventive slot ribbon type cable comprising a stack of core wire ribbons wherein a plurality of core wires are aligned and embedded in a flat plastic material, the stack being housed in each of a plurality of slots formed longitudinally of the outer periphery of a core structure, the core structure being covered with a sheath to form the cable, wherein the stack is wound with a water absorptive tape, or the core structure housing the stack is wound with a water absorptive tape, and said water absorptive tape is made of a water absorptive polymer complex obtained by polymerizing a water soluble ethylenically unsaturated monomer impregnating or coated on a tapelike support.

8. A water penetration preventive slot ribbon type cable as recited in claim 7, wherein the water soluble ethylenically unsaturated monomer is selected from the group consisting of acrylic acid, an alkali metal salt of acrylic acid, an ammonium salt of acrylic acid, methacrylic acid, an alkali metal salt of methacrylic acid, an ammonium salt of methacrylic acid, acrylamide, methacrylamide, N-methylolacrylamide, N-methylolmethacrylamide, ethyleneglycol monoacrylate and ethyleneglycol monomethacrylate.

9. A water penetration preventive slot ribbon type cable as recited in claim 7, wherein the water soluble ethylenically unsaturated monomer is selected from the group consisting of acrylic acid, an alkali metal salt of acrylic acid wherein at least 20% of the carboxyl groups have been neutralized, an ammonium salt of acrylic acid wherein at least 20% of the carboxyl groups have been neutralized, methacrylic acid, an alkali metal salt of methacrylic acid wherein at least 20% of the carboxyl groups have been neutralized, and an ammonium salt of methacrylic acid wherein at least 20% of the carboxyl groups have been neutralized.

* * * * *